Aug. 29, 1950 E. J. CLEARY 2,520,237
WARNING SIGNAL FOR HYDRAULIC BRAKES
Filed Jan. 15, 1949
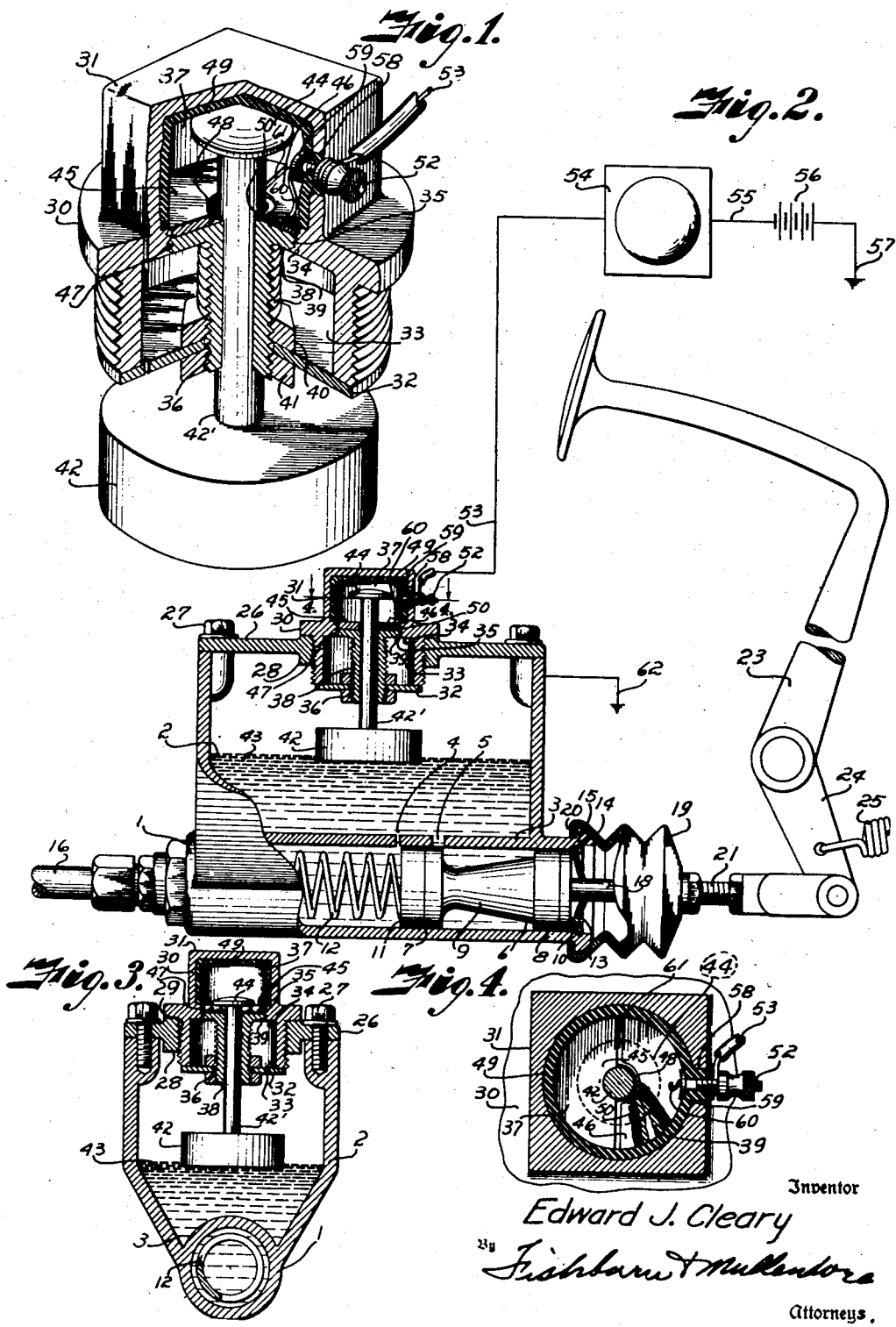
Inventor
Edward J. Cleary
By Fishburn & Mullendore
Attorneys.

Patented Aug. 29, 1950

2,520,237

UNITED STATES PATENT OFFICE 2,520,237

WARNING SIGNAL FOR HYDRAULIC BRAKES

Edward J. Cleary, Kansas City, Mo.

Application January 15, 1949, Serial No. 71,106

2 Claims. (Cl. 200—84)

This invention relates to a signal device and more particularly to a signal device for operation in hydraulic braking systems to indicate when the fluid in the reservoir of the system has dropped to a predetermined level to give notice of such droppage to the operator of the automobile.

With signal devices heretofore in use having float control the working parts are within the liquid reservoir which have a tendency to corrode and not insure proper workage when the fluid in the reservoir becomes low.

It is the principal object of the present invention to provide a float in a fluid reservoir for hydraulic braking systems electrically controlled in which the contact points controlling the float mechanism is in a chamber separate from the fluid reservoir.

Other objects of the invention are to provide a fluid reservoir with a plug having its chamber lined with a non-conductive material, such as hard rubber or the like; to provide electric contact plates within said chamber connecting with an electric circuit; to provide a float adapted to engage the fluid in the fluid reservoir and having a stem extending into the chamber above the reservoir; to provide a contact point on said stem within said chamber to energize the signal device when the fluid in the reservoir drops to a predetermined level, and to provide a device of this character simple, economical to manufacture and efficient in operation.

In accomplishing these and other objects of the present invention I have provided improved details of structure, the preferred forms of which are illustrated in the accompanying drawings, wherein:

Fig. 1 is an elevational view, partly in cross-section of the float and housing plugs for fitting into the fluid reservoir.

Fig. 2 is a side view partly in cross-section of the fluid reservoir and float controlled mechanism therein, including the electric circuit.

Fig. 3 is a transverse cross-sectional view through the fluid reservoir and float mechanism.

Fig. 4 is a cross-sectional view taken on a line 4—4 Fig. 2.

Referring more in detail to the drawings.

1 designates a master cylinder of a hydraulic braking system provided with a reserve reservoir 2 formed integrally therewith and extending longitudinally above the master cylinder. The upper side of the cylinder 1 provides a semi-cylindrical partition 3 between the reservoir 2 and the master cylinder, and is provided with ports 4 and 5 leading to the master cylinder so that fluid may pass back and forth between the reservoir and the cylinder, the port 5 being of substantially larger diameter than the port 4 for a purpose later described.

Adapted to reciprocate within the cylinder 1 is a piston 6 having a working head 7 and a follower head 8, the piston 6 tapering and having a reduced neck as indicated at 9 (Fig. 2). The follower head is provided with a cup member 10 and the head 7 is also provided with a cup member 11 on its outer face. The piston is held yieldingly and normally in retracted position at one end of the cylinder 1 by a spring 12 interposed between the cup member 11 of the working head 7 and the opposite end of the cylinder, in which position the cup portion 10 of the follower head 8 engages against a washer 13 interposed in the adjacent open end portion of the cylinder and held in place by a split retaining ring 14 engaging in an annular groove 15 in the cylinder wall adjacent the washer.

When the piston is in its normal position the port 4 will be uncovered establishing direct communication between the cylinder and the reserve reservoir 2. The port is first covered and then cut off from communication with the cylinder ahead of the working head 7 of the piston when the latter is moved from normal position to displace the liquid ahead thereof from the cylinder and through the tubular connection 16 which leads from the cylinder to the brake setting means (not shown), and thus creating the hydrostatic pressure in the system to effect the setting of the brakes in the usual manner.

The port 5 is of greater area than the restricted port 4 to establish communication between the reservoir 2 and the space in the cylinder between the working head 7 and the follower head 8, port 5 being partially covered by the working head 7 of the piston 6 in the normal position of the latter but being uncovered and fully opened when the piston is moved in the direction for setting the brakes. The space 17 between the piston heads 7 and 8 is thus constantly filled with the liquid from the reservoir 2 thereby practically effecting a seal which prevents the entrance of air as well as equalizing and balancing the liquid pressure at the side of the working head 7 of the piston.

18 designates a stem integrally connected with the piston 6 and extending axially therefrom to the central opening in the washer 13 and also through a conventional bellows-like protector 19 attached to an external annular collar 20 on the end portion of the cylinder 1 and which extends outwardly from the reservoir 2 as best illustrated in Fig. 2. The outer end of the stem 18 is threaded as indicated at 21 for receiving a coupling for attaching a brake 23, through an arm 24 provided with the usual spring 25 for exerting tension thereon and holding the piston in its normal position and returning it to such position when the foot pedal is released through actuation by said arm as is conventional practice.

Referring particularly to the unitary float controlled electrical circuit insertable in the reservoir 2, 26 designates a cover plate detachably secured to the reservoir by set screws or the like 27. The plate is thickened at the center thereof as indicated at 28 and is provided with a screw threaded opening 29 adapted to receive a screw threaded closure plug 30 having a nut extension portion 31 to be engaged by a suitable tool (not shown) for applying and removing the plug from the opening 29 in the cover plate.

A plate 32 is adapted to engage the lower end of the plug forming a chamber 33 in the lower portion thereof and provided between the chamber 33 and the nut 31 is an annular shoulder 34 forming an axial bore in the plug screw-threaded as indicated at 35, the plate 32 has an axial bore as indicated at 36. The nut 31 is hollow forming and provides a chamber 37 in the top of the plug.

Adapted to engage in the axial bore of the plate 32 and the axial bore of the shoulder 34 is a threaded sleeve 38 provided with a laterally extending annular collar 39 adapted to engage the threaded shoulder 34. The annular collar 39 is slightly less in diameter than the shoulder 34 as best illustrated in Fig. 1. A threaded washer or nut 40 engages the threaded sleeve 38 on the upper side of the plate 32 and a threaded nut 41 engages the sleeve below the plate to hold the plate rigidly to the lower end of the plug 30.

A float 42 adapted to contact the liquid 43 in the housing 2 is provided with an upstanding stem 42' which extends through the threaded sleeve 38 and has a head 44 extending into the chamber 37 of the nut 31 so that the float, when assembled, will be retained in the removable plug. The underside of the head 44 forms a contact surface adapted to engage with contact plates 45 and 46 adapted to seat upon the annular collar 39 of the sleeve 38 and is screw-threadably connected to the annular shoulder 34 as indicated at 47, Fig. 1. The plates 45 and 46 are cut away as indicated at 48 so as to be spaced from the stem 43 of the float member.

The side walls and top of the chamber 37 of the nut 31 are provided with a non-conductive material such as hard rubber or the like 49 and located between the plate 46 and the annular collar 39 of the sleeve 38 is a non-conductive strip of material such as hard rubber or the like 50.

One side of the nut 31 and the rubber lining 49 is provided with aligned openings adapted to receive an electrical connection 52 for an insulated line 53 leading to a signal device such as a light or buzzer 54 and the circuit is completed by a wire 55 leading from the signal device to one pole of a battery or terminal of the source of electrical energy indicated diagrammatically at 56 the opposite forward terminal of which is grounded as at 57. The electrical connection 52 is insulated from the wall of the nut 31 by a rubber washer or the like 58 (Fig. 1), and is provided on the inside of the non-conductive material with a nut or retaining member 59. Attached to the connection 52 is a wire 60 having its opposite end connected to the plate 46 in the chamber 37.

It will be noted in Fig. 1 that the plates 45 and 46 are spaced apart as indicated at 61 and the reservoir 2 is grounded as indicated at 62. The float 42 may be removably secured to the stem 43 by the usual threads or the like (not shown).

In assembling the closure plug 30 the float 42 is removed from the stem 42' and the sleeve 38, washer 40, plates 45 and 46 and the insulating material 49 placed around the stem 42' and the head 44 of the stem, being smaller than the axial bore in the plug, may be inserted therethrough and into the chamber 37. The collar 39 on the sleeve and the plates 45 and 46 are adapted to engage in the threads on the annular shoulder 34 of the plug to secure the sleeve therein. The plate 32 is then placed around the stem and held in place thereon by the nut 41 to form a rigid structure through adjustment of the nut 40 on the sleeve. The float 42 is then secured to the lower end of the stem 42' and the entire plug 30 is ready to screw-threadably engage in the axial bore opening in the plate 26 of the reservoir.

Operation of a device assembled as described is as follows.

The float 42 is adapted to ride upon the liquid 43 in the reservoir 2 and will move up and down as the liquid fluctuates. Use of the brakes of the vehicle will eventually dissipate some of the fluid and the float will eventually drop in the reservoir. When the float drops to a point where the lower face of the head 44 contacts the plates 45 and 46 the electrical circuit will be closed through line 53 and the light or other signalling device energized to advise the operator of the vehicle that the fluid in the brakes is getting low.

I have provided a vent 54 in the wall of the plug 30 as indicated at Figs. 1 and 2 and a vent 55 in the plate 32 to prevent a vacuum in the chamber 33 and the reservoir which might hinder operation of the float.

The stem 42' fits loosely in the sleeve 38 but is sufficiently close to provide a substantial seal of the fluid in the reservoir from the chamber 37 to maintain the contact points of the electrical parts substantially dry.

It will be obvious from the foregoing that I have provided an improved signal device consisting of a float in the fluid reservoir having electrical contact points substantially free from moisture and to insure a positive operation thereof.

What I claim and desire to secure by said Letters Patent is:

1. In combination with a reservoir of a hydraulic braking system containing a fluid supply therein and having an opening in the upper side thereof, a hollow plug in said opening having an enlarged recess in the lower end forming an annular shoulder in said plug, threads on said shoulder, a threaded sleeve having a threaded collar for engaging said shoulder and forming an upper and lower chamber in said plug, spaced contact plates carried on said collar, and engaging said threaded shoulder, an insulating material between said shoulder and one of said plates, a non-conductive material surrounding the walls and top of said upper chamber, a terminal extending through the side of the upper chamber, and electric wire connected to the inner end of said terminal and to the insulated plate, a float for said fluid having a stem extending through said sleeve and into the upper chamber, a head on said stem for contacting said contact plates for closing the circuit when the fluid drops in said reservoir a predetermined distance, a plate closing the lower end of the lower chamber, and means engaging said sleeve for holding said plate to said plug.

2. In combination with a reservoir of a hydraulic braking system containing a fluid supply therein and having an opening in the upper side thereof, a hollow plug in said opening having an enlarged recess in the lower end forming an annular shoulder in said plug, a sleeve having a collar for engaging said shoulder and forming upper and lower chambers in said plug, contact plates carried on said collar, means insulating one of said plates from said collar a terminal extending through the side of the upper chamber, an electric wire connected to the inner end of said terminal and to the insulated plate, a float for said fluid having a stem extending through said sleeve and into the upper chamber and slidable in said sleeve, means on said stem for contacting said contact plates for closing the circuit when the fluid drops in said reservoir a predetermined distance, and means closing the lower end of said plug.

EDWARD J. CLEARY.

REFERENCES CITED

The following references are of record in the file of this patent:

UNITED STATES PATENTS

| Number | Name | Date |
|---|---|---|
| 1,643,238 | Curtis | Sept. 20, 1927 |
| 1,911,811 | Coote | May 30, 1933 |
| 2,253,260 | Alcorn | Aug. 19, 1941 |